United States Patent
Moriya

(10) Patent No.: US 7,099,768 B2
(45) Date of Patent: Aug. 29, 2006

(54) AUTOMATIC SHUTDOWN CONTROL FOR VEHICULAR INTERNAL COMBUSTION

(75) Inventor: Kouki Moriya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 254 days.

(21) Appl. No.: 10/477,938

(22) PCT Filed: Jun. 13, 2003

(86) PCT No.: PCT/JP02/05912

§ 371 (c)(1),
(2), (4) Date: Nov. 18, 2003

(87) PCT Pub. No.: WO02/103179

PCT Pub. Date: Dec. 27, 2002

(65) Prior Publication Data

US 2004/0149245 A1 Aug. 5, 2004

(30) Foreign Application Priority Data

Jun. 14, 2001 (JP) .............................. 2001-179882

(51) Int. Cl.
*F02D 45/00* (2006.01)
*F02N 11/00* (2006.01)

(52) U.S. Cl. .................................... 701/112; 123/179.4

(58) Field of Classification Search ............. 123/179.3, 123/179.4, 179.5, 198 DB, 198 DC; 701/112, 701/113; 73/116, 117.1, 117.2, 118.2
See application file for complete search history.

(56) References Cited

U.S. PATENT DOCUMENTS 6,048,288 A 4/2000 Tsujii et al.
6,190,284 B1 2/2001 Kuroda et al. .............. 477/107
6,283,086 B1 9/2001 Yamamoto et al.
6,460,500 B1 * 10/2002 Ooyama et al. ......... 123/179.3

FOREIGN PATENT DOCUMENTS

| DE | 199 11 736 A1 | 9/1999 |
|----|---|---|
| DE | 198 31 487 C1 | 3/2000 |
| EP | 0 916 546 A2 | 5/1999 |
| EP | 1 077 328 A1 | 2/2001 |
| JP | A 6-200791 | 7/1994 |
| JP | A 6-200792 | 7/1994 |
| JP | A 6-257483 | 9/1994 |
| JP | A-08-168105 | 6/1996 |
| JP | A-11-002143 | 1/1999 |
| JP | A 2000-356147 | 12/2000 |
| JP | A-2001-055939 | 2/2001 |
| JP | A-2001-107769 | 4/2001 |
| JP | A 2001-132489 | 5/2001 |

OTHER PUBLICATIONS

U.S. Appl. No. 10/196,230, filed Jul. 17, 2002, Mizutani.

* cited by examiner

*Primary Examiner*—Andrew M. Dolinar
*Assistant Examiner*—Johnny H. Hoang
(74) *Attorney, Agent, or Firm*—Oliff & Berridge, PLC

(57) ABSTRACT

An automatic shutdown control apparatus for a vehicular internal combustion engine, which permits automatic shutdown of an internal combustion engine when a value indicative of vehicle driving history is equal to or greater than a predetermined reference value. The control apparatus automatically shuts down the internal combustion engine when a predetermined shutdown condition including the automatic shutdown permission is satisfied while the internal combustion engine is operating. The control apparatus detects the degree of congestion of the road, and sets the reference value smaller when the degree of congestion is high.

18 Claims, 3 Drawing Sheets

AUTOMATIC SHUTDOWN CONTROL FOR VEHICULAR INTERNAL COMBUSTION

BACKGROUND OF THE INVENTION

The present invention relates to an automatic shutdown control apparatus for a vehicular internal combustion engine. Particularly, it relates to an automatic shutdown control apparatus and automatic shutdown control method for a vehicular internal combustion engine, which automatically shuts down the internal combustion engine in the case when the vehicle is standing still and the engine is in a predetermined operating state.

For example, Japanese Laid-Open Patent Publication No. 6-257483 discloses an automatic shutdown control apparatus which automatically shuts down an internal combustion engine in the case where an automatic shutdown condition is satisfied after start-up of the internal combustion engine mounted on a vehicle, based on the operating states of the vehicle and internal combustion engine, and automatically starts the internal combustion engine by driving an electric motor in the case where an automatic start-up condition is satisfied. This apparatus inhibits automatic shutdown of the internal combustion engine in the case where the driving distance of the vehicle is less than a predetermined distance after the automatic start-up condition was satisfied and the internal combustion engine was automatically started up. The use of such a structure can prevent automatic start-up and automatic shutdown of the internal combustion engine from being repeated frequently due to traffic jams or the like and can reduce the battery power consumption to prevent draining the battery.

In the case where starting and stopping of a vehicle are repeated frequently due to traffic jams or the like, for example, the driving distance from the start-up of the vehicle to the standstill location becomes shorter. That is, it takes a long time for the driving distance after the start-up of the internal combustion engine to become equal to or greater than a predetermined distance. In the apparatus of the aforementioned publication, therefore, opportunity for automatic shutdown of the internal combustion engine decreases in a traffic jam such that fuel consumption cannot be improved.

SUMMARY OF THE INVENTION

It is an object of the present invention to provide an automatic shutdown control apparatus and automatic shutdown control method for a vehicular internal combustion engine which can adequately secure opportunities for automatic shutdown of an internal combustion engine in accordance with the degree of congestion of the road.

To achieve the object, the present invention provides the following automatic shutdown control apparatus for a vehicular internal combustion engine. The apparatus has shutdown permission means, automatic shutdown means, detection means and alteration means. The shutdown permission means permits automatic shutdown of an internal combustion engine when a value indicative of vehicle driving history is equal to or greater than a predetermined reference value. The automatic shutdown means automatically shuts down the internal combustion engine when a predetermined shutdown condition including the automatic shutdown permission is satisfied while the internal combustion engine is running. The detection means detects the degree of congestion of the road. The alteration means changes the reference value in accordance with the detected degree of congestion.

The present invention further provides an automatic shutdown control method for a vehicular internal combustion engine. The method includes a step of permitting automatic shutdown of an internal combustion engine when a value indicative of vehicle driving history is equal to or greater than a predetermined reference value; a step of automatically shutting down the internal combustion engine when a predetermined shutdown condition including the automatic shutdown permission is satisfied while the internal combustion engine is running; a step of detecting the degree of congestion of the road; and a step of changing the reference value in accordance with the detected degree of congestion.

The present invention further provides a computer readable recording medium where a program is recorded for executing automatic start-up control of an internal combustion engine. The program causes a computer to execute a step of permitting automatic shutdown of an internal combustion engine when a value indicative of vehicle driving history is equal to or greater than a predetermined reference value; a step of automatically shutting down the internal combustion engine when a predetermined shutdown condition including automatic shutdown permission of the shutdown means is satisfied while the internal combustion engine is operating; a step of detecting the degree of congestion of the road; and a step of changing the reference value in accordance with the detected degree of congestion.

DETAILED DESCRIPTION

One embodiment embodying the present invention will be described below based on FIGS. 1 to 4.

Figure 1:
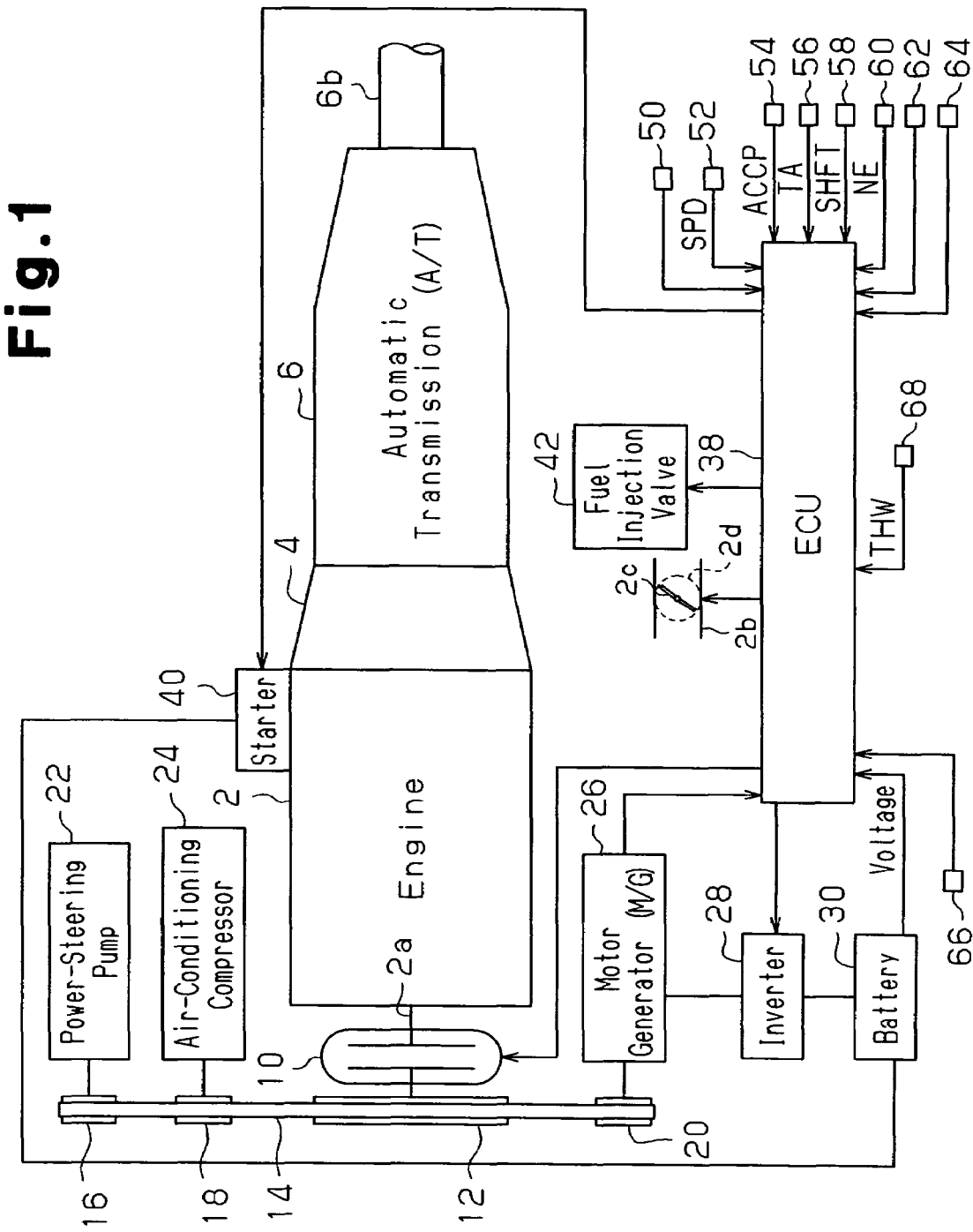
FIG. 1 is a structural diagram of an internal combustion engine and a control apparatus therefor according to a first embodiment embodying the present invention.

FIG. 1 is a system structural diagram of an internal combustion engine and a control apparatus therefor according to this embodiment. In this embodiment, a gasoline type engine 2 is used as an internal combustion engine. The engine 2 is mounted on a vehicle. The engine 2 is controlled in such a way as to be automatically shut down and automatically started when the vehicle is in a predetermined operating state as will be discussed later.

The power generated by the engine 2 is output to an output shaft 6b from a crankshaft 2a of the engine 2 via a torque converter 4 and an automatic transmission (A/T) 6, and is transmitted to unillustrated wheels. The power generated by the engine 2 is transmitted to a belt 14 via an electromagnetic clutch 10 connected to the crankshaft 2a and a main pulley 12. First, second and third pulleys 16, 18 and 20 are rotated by the power transmitted from the belt 14. The electromagnetic clutch 10 selectively switches between power transmission and shutdown between the main pulley 12 and the crankshaft 2a.

A power-steering pump 22 as an engine ancillary is driven by power transmission from the first pulley 16. An air-conditioning compressor 24 as an engine ancillary is driven by power transmission from the second pulley 18. A motor generator (M/G) 26 is driven by power transmission from the third pulley 20 and the M/G 26 functions as a dynamo. The M/G 26 is electrically connected to an inverter 28. The switching action of the inverter 28 effects charging to a battery 30 from the M/G 26.

When it becomes necessary to drive the power-steering pump 22 or the air-conditioning compressor 24 with the engine 2 in an automatic shutdown state, an electronic control unit (ECU) 38 releases the electromagnetic clutch 10 and causes the M/G 26 to function as an electric motor. In this case, the inverter 28 changes the number of rotations of the M/G 26 by adjusting the supply of electric energy to the M/G 26 from the battery 30 in response to an instruction from the ECU 38.

In an automatic start-up routine after automatic shutdown of the engine 2, the ECU 38 sets the electromagnetic clutch 10 in a connected state and starts the engine 2 by executing cranking by causing the M/G 26 to rotate the crankshaft 2a.

Connected to the ECU 38 are an idle switch 50 which detects depression of the acceleration pedal, a speed sensor 52 which detects the number of rotations of the output shaft 6b of the A/T 6 and a pedal position sensor 54 which detects the amount of depression of the acceleration pedal (ACCP). Also connected to the ECU 38 are a throttle angle sensor 56 which is provided in an air-intake passage 2b of the engine 2 and detects the degree of opening of a throttle valve 2c (throttle angle TA) for adjusting the amount of intake air, and a shift position sensor 58 which detects a shift position SHFT of the A/T 6. Further connected to the ECU 38 are an engine speed sensor 60 which detects an engine speed NE, an economy running switch 62 for a driver to instruct the execution of an economy running mode, and an air-conditioning switch 64 for driving an air-conditioner. Further, a brake switch 66 which detects the depression of a brake pedal and a coolant temperature sensor 68 which detects an engine coolant temperature THW.

The ECU 38 is comprised mainly of a microcomputer and executes necessary arithmetic operations according to a program written in a ROM. Based on the arithmetic operation results, the ECU 38 drives a throttle valve motor 2d which adjusts the degree of opening of the throttle valve 2c, the electromagnetic clutch 10, the inverter 28, a starter 40 and an unillustrated igniter to adequately control the engine 2 and the A/T 6. A fuel injection valve 42 injects fuel to an air-intake port (not shown) of the engine 2. A plurality of fuel injection valves 42 may inject fuel to associated individual combustion chambers (not shown).

In the case where the economy running switch 62 is set ON by the driver, the ECU 38 executes an automatic shutdown routine and automatic start-up routine of the engine 2 when the vehicle comes to a predetermined running state.

In the automatic shutdown routine of the engine 2, the ECU 38 determines whether an automatic shutdown condition is met or not based on an operation state for determining the execution of automatic shutdown. Information indicating the operation state for determining the execution of automatic shutdown includes, for example, the engine coolant temperature THW detected by the coolant temperature sensor 68, whether or not there is depression of the acceleration pedal, which is detected by the idle switch 50, the voltage of the battery 30, whether or not there is depression of the brake pedal, which is detected by the brake switch 66, and a vehicle speed SPD, which is converted from the detected value from the speed sensor 52.

For instance, in the case where all of the conditions as follows are satisfied, (1) a state where the engine 2 is after warm-up but is not overheated (the engine coolant temperature THW is lower than an upper limit THWmax and higher than a lower limit THWmin), (2) a state where the acceleration pedal has not been depressed (the idle switch 50 is ON), (3) a state where the amount of charge of the battery 30 is equal to or greater than a certain amount (the battery voltage is equal to or higher than a reference voltage), (4) a state where the brake pedal is depressed (the brake switch 66 is ON) and (5) a state where the vehicle is standing still (the vehicle speed SPD is 0 km/h), the ECU 38 decides that the automatic shutdown condition has been met.

When automatic shutdown and automatic start-up of the engine 2 are repeated frequently, the power consumed in the M/G 26 becomes large, which may lead to drainage of the battery 30. Therefore, the ECU 38 permits automatic shutdown of the engine 2 when a value indicative vehicle driving history after automatic start-up of the engine 2 becomes equal to or greater than a predetermined reference value as one automatic shutdown condition of the engine 2, and inhibits automatic shutdown of the engine 2 when the value indicating the vehicle driving history is less than the predetermined reference value. In this embodiment, driving distance is used as the value indicative of the vehicle driving history and the reference value. The driving distance as the reference value is called "an engine shutdown permitting driving distance."

The ECU 38 detects the degree of congestion of the road and variably sets the value of the engine shutdown permitting driving distance according to the degree of congestion. That is, when the degree of congestion of the road is high due to a traffic jam or the like, the possibility of the vehicle running at a low speed or stopping increases, so that the driving distance after automatic start-up of the engine 2 increases relatively gradually. When the degree of congestion of the driving road is low, on the other hand, the vehicle can continue running at an arbitrary speed, so that the driving distance after automatic start-up of the engine 2 increases relatively drastically. If the engine shutdown permitting driving distance is a constant value, the time needed for the driving distance of the vehicle to become equal to or greater than the engine shutdown permitting driving distance becomes longer when the degree of congestion of the road is high, reducing the opportunity for automatically shutting down the engine 2. Therefore, the engine shutdown permitting driving distance is set so as to become a small value in the case where the degree of congestion of the road is high and the engine shutdown permitting driving distance is set so as to become a large value in the case where the degree of congestion of the road is low. As a result, the time needed for the driving distance to become equal to or greater than the engine shutdown permitting driving distance is set satisfactorily, making it possible to secure the automatic shutdown of the engine 2.

In the case where the automatic shutdown condition is met as the driver stops the automobile at an intersection or the like, the ECU 38 executes a routine for shutting down the engine 2. In the shutdown routine, for example, fuel injection from the fuel injection valve 42 is stopped and further ignition control is stopped of the air-fuel mixture in the combustion chamber of the engine 2 by an ignition plug. This stops fuel injection and ignition so that the engine 2 is stopped immediately.

In the automatic start-up routine for the engine 2, the ECU 38 determines whether or not the automatic start-up condition is met based on the operation state for determining the execution of automatic start-up. The operation state for determining the execution of automatic start-up includes, for example, the engine coolant temperature THW, the status of the idle switch 50, the voltage of the battery 30, the status of the brake switch 66 and the vehicle speed SPD, which are the same as the data read in the automatic shutdown routine.

In the case where any one of the aforementioned conditions (1) to (5) are not satisfied in the engine shutdown state in the automatic shutdown routine, the ECU 38 decides that the automatic start-up condition has been met. Although the conditions (1) to (5) have the same requirements as the individual conditions used in the above-described automatic shutdown condition, they need not be limited to them but other conditions than the conditions (1) to (5) may be set. Or they may be limited to only some of the conditions (1) to (5).

In the case where any one of the aforementioned conditions (1) to (5) becomes unsatisfied in the shutdown state of the engine 2 in the automatic shutdown routine, the ECU 38 starts the automatic start-up routine. The ECU 38 sets the electromagnetic clutch 10 in a connected state, drives the M/G 26 to rotate the crankshaft 2a of the engine 2 and executes a fuel injection routine and an ignition timing control routine at the time of start-up to automatically start the engine 2. When start-up is completed, the ECU 38 initiates routines needed to run the engine 2, such as an ordinary fuel injection amount control routine and ignition timing control routine.

Next, the automatic shutdown routine, automatic start-up routine of the engine 2, and a shutdown permission decision value setting routine for the engine 2, which are executed by the ECU 38, will be described. Those routines are executed when the driver sets the economy running switch 62 ON. The shutdown permission decision value setting routine for the engine 2 may be executed regardless of the manipulation of the economy running switch 62.

Figure 4:
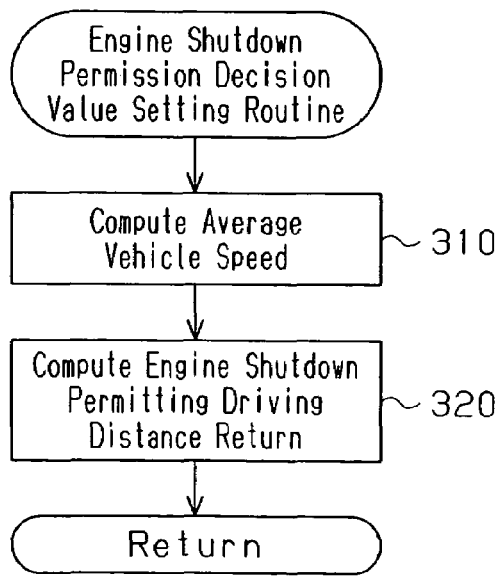
FIG. 4 is a flowchart illustrating an engine shutdown permission decision value setting routine which is executed by the ECU in FIG. 1.

FIG. 4 is a flowchart illustrating the shutdown permission decision value setting routine for the engine 2. This routine is periodically repeated at a short time interval set beforehand. As the routine is initiated, the ECU 38 first reads the vehicle speed SPD obtained by conversion from the detected value from the speed sensor 52 into the work area of an internal RAM of the ECU 38 and computes an average vehicle speed of the vehicle in step 310. If the degree of congestion of the road is high, the possibility that the vehicle travels at a low speed or stops becomes higher, so that the average vehicle speed becomes slower. If the degree of congestion of the road is low, on the other hand, the vehicle can continue traveling at an arbitrary vehicle speed, so that the average vehicle speed becomes faster. Therefore, there is a correlation between the degree of congestion of the road and the average vehicle speed of a vehicle, so that the degree of congestion of the road can be detected easily based on the average vehicle speed of the vehicle.

Next, based on the average vehicle speed computed in step 310, the ECU 38 computes the shutdown permitting driving distance of the engine 2 by referring to a map stored in an internal ROM of the ECU 38 in step 320. The faster the average vehicle speed, i.e., the lower the degree of congestion, the greater setting for the shutdown permitting driving distance of the engine 2. The slower the average vehicle speed is, i.e., the higher the degree of congestion, the smaller setting of the shutdown permitting driving distance of the engine 2. The shutdown permitting driving distance of the engine 2 is updated to a new value sequentially according to a change in average vehicle speed. The shutdown permitting driving distance of the engine 2 can be computed by executing a predetermined arithmetic operation based on the average vehicle speed.

Figure 2:
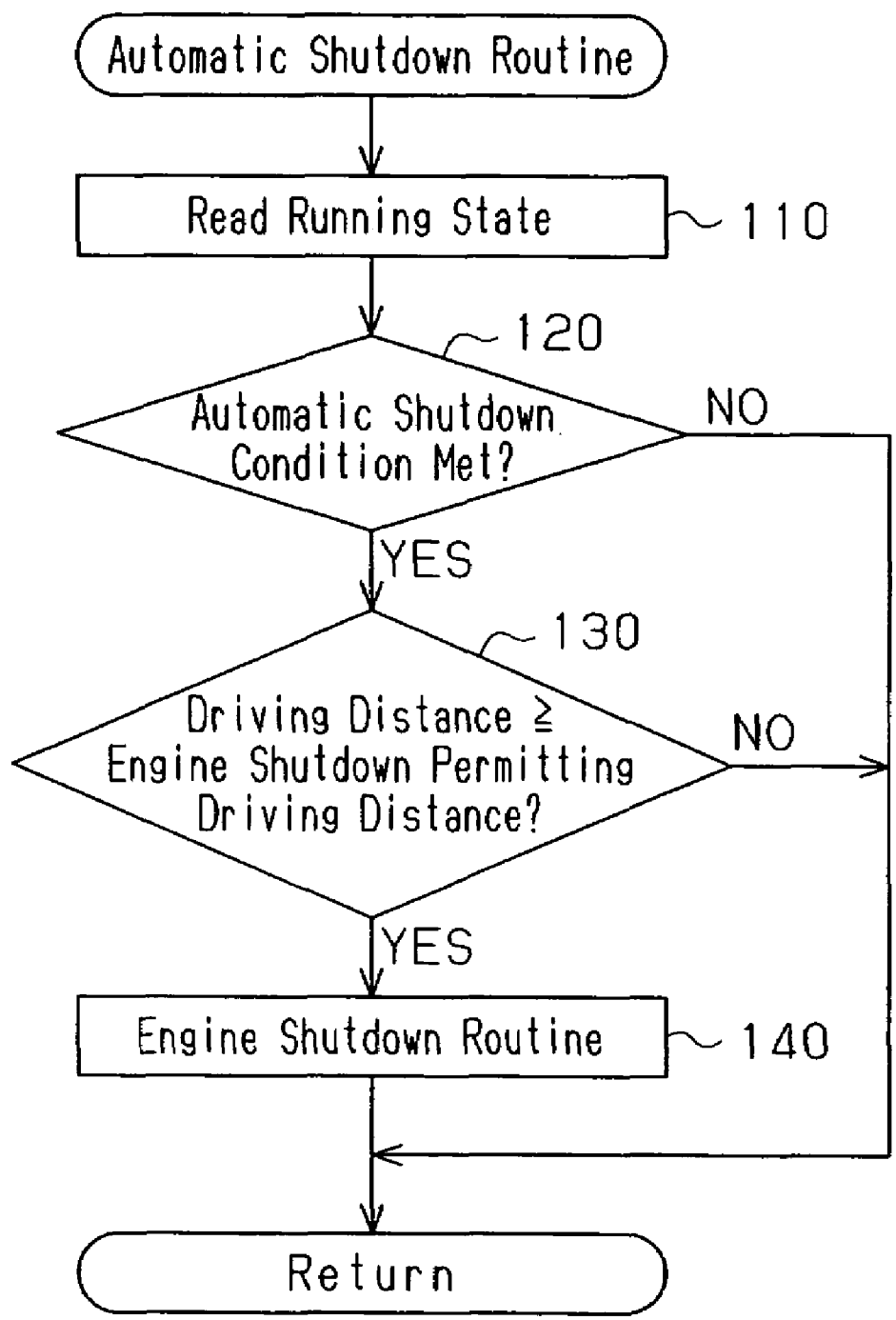
FIG. 2 is a flowchart illustrating an automatic shutdown routine which is executed by an ECU in FIG. 1.

FIG. 2 illustrates a flowchart for the automatic shutdown routine. This routine is periodically repeated at a short time interval set beforehand. As the routine is initiated, the ECU 38 first reads the operation state for determining the execution of automatic shutdown in step 110. The ECU 38 reads into the work area of the internal RAM of the ECU 38, for example, the engine coolant temperature THW detected by the coolant temperature sensor 68, whether or not there is depression of the acceleration pedal, which is detected by the idle switch 50, the amount of charge of the battery 30, whether or not there is depression of the brake pedal, which is detected by the brake switch 66 and a vehicle speed SPD, which is converted from the detected value from the speed sensor 52, and so forth.

Next, in step 120, the ECU 38 determines from these operating states whether or not the automatic shutdown condition has been met. That is, the ECU 38 decides that the automatic shutdown condition has been met when all of the conditions (1) to (5) are satisfied.

In case of "NO" in step 120, i.e., in the case where any one of the aforementioned conditions (1) to (5) is not satisfied, the ECU 38 temporarily terminates this routine, concluding that the automatic shutdown condition is not met.

In case of "YES" in step 120, on the other hand, i.e., the automatic shutdown condition is met as the driver has stopped the vehicle at an intersection or the like, the routine proceeds to step 130 next. In step 130, the ECU 38 determines whether or not to permit automatic shut down of the engine 2 based on whether or not the driving distance after automatic start-up of the engine 2 is equal to or greater than the shutdown permitting driving distance of the engine 2. The shutdown permitting driving distance of the engine 2 is the latest value computed in step 320 in FIG. 4.

In case of "NO" in step 130, i.e., when the driving distance after automatic start-up of the engine 2 is less than the shutdown permitting driving distance of the engine 2, the ECU 38 temporarily terminates this routine.

In case of "YES" in step 130, i.e., if the driving distance after automatic start-up of the engine 2 is equal to or greater than shutdown permitting driving distance of the engine 2, it is determined that automatic shutdown of the engine 2 is permitted and the routine proceeds to step 140. In step 140, the shutdown routine of the engine 2 is performed, e.g., fuel injection from the fuel injection valve 42 is stopped and further ignition control of the air-fuel mixture in the combustion chamber by the ignition plug is stopped. As the fuel injection and ignition are stopped, the operation of the engine 2 is stopped immediately. The routine is temporarily terminated this way. In this manner, the automatic shutdown routine is executed.

Figure 3:
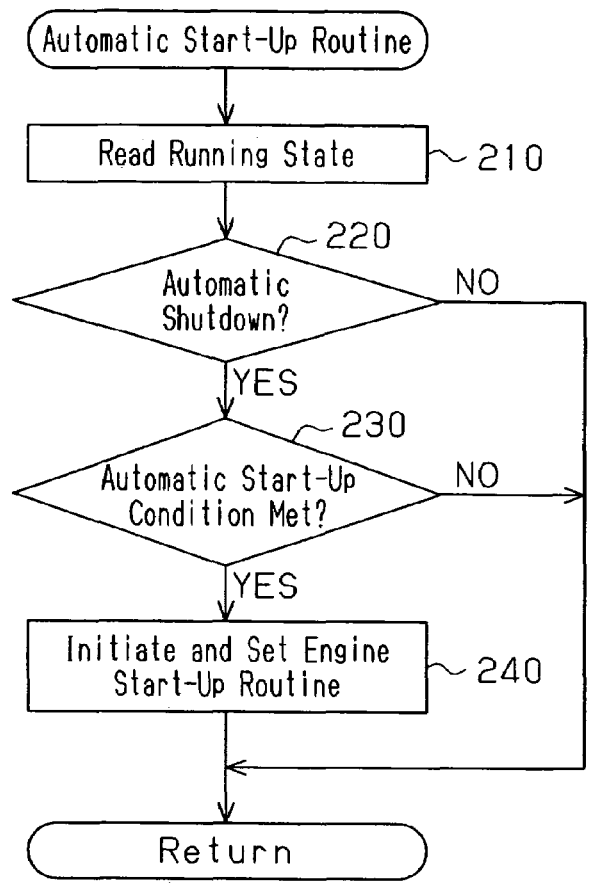
FIG. 3 is a flowchart illustrating an automatic start-up routine which is executed by the ECU in FIG. 1.

FIG. 3 illustrates a flowchart for the automatic start-up routine. This routine is executed periodically repeatedly every short time set beforehand. As the routine is started, first, the running state for determining the execution of automatic start-up is read in step 210. Here, the ECU 38 reads into the work area of the internal RAM, for example, the engine coolant temperature THW, the status of the idle switch 50, the amount of charge of the battery 30, the status of the brake switch 66 and the vehicle speed SPD, which are the same as the data read in step 110 of the automatic shutdown routine in FIG. 2.

Next, in step 220, it is determined whether or not the engine 2 is in a state of being automatically shut down by the above-described automatic shutdown routine (FIG. 2). In case of "NO" in step 220, i.e., if the engine 2 is not being automatically shut down, the ECU 38 temporarily terminates this routine.

In case of "YES" in step 220, on the other hand, i.e., if the engine 2 is being automatically shut down, the routine goes to step 230. In step 230, it is determined from the operation state read in step 210 whether or not the automatic start-up condition is met. That is, in the case where any one of the aforementioned conditions (1) to (5) is not satisfied, the ECU 38 decides that the automatic start-up condition has been met.

In case of "NO" in step 230, i.e., when the engine 2 is in a shutdown state of the automatic shutdown routine and when all of the conditions (1) to (5) are satisfied, the ECU 38 temporarily terminates the routine, concluding that the automatic start-up condition is not met.

In case of "YES" in step 230, i.e., in the case where any one of the aforementioned conditions (1) to (5) becomes unsatisfied in the shutdown state of the engine 2 of the automatic shutdown routine, it is considered that the automatic start-up condition is met and the routine goes to step 240. In step 240, the automatic start-up routine is initiated and the ECU 38 temporarily terminates this routine.

As the automatic start-up routine starts in step 240, the ECU 38 first drives the M/G 26 to rotate the crankshaft 2a of the engine 2 and executes the fuel injection routine and ignition timing control routine at the time of start-up to automatically start the engine 2. When the automatic start-up is completed, routines needed to run the engine 2, such as the ordinary fuel injection amount control routine and ignition timing control routine, are initiated.

In this embodiment, the ECU 38 functions as shutdown permission means, automatic shutdown means, detection means and alteration means.

This embodiment has the following effects.

The ECU 38 detects the degree of congestion of the road and sets the shutdown permitting driving distance of the engine 2 based on the degree of congestion. Even if the degree of congestion of the road is high due to traffic jams or the like, therefore, the time needed for the driving distance after automatic start-up of the engine 2 to become equal to or greater than the shutdown permitting driving distance of the engine 2 can be shortened. As a result, the ECU 38 can permit shutdown of the engine 2 and can secure the opportunity for automatic shutdown of the engine 2.

As the value indicative of the vehicle driving history is set to the driving distance after start-up of the engine 2, it is possible to easily determine if there is permission for automatic shutdown of the engine 2.

When the degree of congestion of the road is high, the possibility that the vehicle travels at a low speed or stops increases, so that the average vehicle speed becomes smaller, and when the degree of congestion of the road is low, on the other hand, the vehicle can continue traveling at an arbitrary vehicle speed so that the average vehicle speed increases. It is therefore possible to easily detect the degree of congestion of the driving road based on the average vehicle speed after start-up of the engine 2.

The M/G 26 is coupled to the crankshaft 2a of the engine 2 in a disconnectable manner. Therefore, the engine 2 can be automatically started up by the M/G 26 and the output of the engine 2 can be increased by the M/G 26 when the output is low.

As an electric motor is used as the M/G 26, it can be used as a dynamo.

The embodiment of the present invention can be modified as follows.

The value indicating the vehicle driving history may be set to the driving time of the vehicle. Even in this case, the operation and effects similar to those of the above-described embodiment can be acquired.

As the structure which detects the degree of congestion of the road, the degree of congestion of the road may be detected based on traffic jam information supplied in a so-called vehicle information and communication system (VICS).

As the structure which detects the degree of congestion of the road, the degree of congestion of the road may be detected based on the distance between a local vehicle and a vehicle running ahead and the vehicle speed of the local vehicle.

As the structure which detects the degree of congestion of the road, the degree of congestion of the road may be detected based on the transition of the rotational speed of the engine 2 after automatic start-up of the engine 2 or the average value of the rotational speed of the engine 2.

As the structure which detects the degree of congestion of the road, the degree of congestion of the road may be detected based on the average value of the driving distance from the start-up of the vehicle to the stopping thereof.

As the structure which detects the degree of congestion of the road, the degree of congestion of the road may be detected based on the average value of the driving time from the start-up of the vehicle to the stopping thereof.

As the structure which detects the degree of congestion of the road, the degree of congestion of the road may be detected based on the acceleration from the start-up of the vehicle to the stopping thereof. In this case, the degree of jamming of the driving road can be detected based on the maximum value of the acceleration or the average value of the acceleration.

The invention claimed is:

1. An automatic shutdown control apparatus for a vehicular internal combustion engine, comprising:
    shutdown permission means for permitting automatic shutdown of the internal combustion engine when a value indicative of vehicle driving history is equal to or greater than a predetermined reference value;
    automatic shutdown means for automatically shutting down said internal combustion engine when a predetermined shutdown condition including said automatic shutdown permission means is satisfied while said internal combustion engine is operating;
    detection means for detecting a degree of congestion of the road; and
    alteration means for changing said reference value in accordance with detection means.

2. The automatic shutdown control apparatus according to claim 1, wherein said alteration means includes means for setting said reference value smaller as the detected degree of congestion is higher.

3. The automatic shutdown control apparatus according to claim 1, wherein the value indicating said vehicle driving history is a driving distance after start-up of said internal combustion engine.

4. The automatic shutdown control apparatus according to claim 1, wherein the value indicative of said vehicle driving history is driving time after start-up of said internal combustion engine.

5. The automatic shutdown control apparatus according to claim 1, wherein said detection means includes means for detecting the degree of jamming of the driving road based on an average vehicle speed after start-up of said internal combustion engine.

6. The automatic shutdown control apparatus claim 1, further comprising automatic start-up means for automatically starting up said internal combustion engine by driving an electric motor when a predetermined start-up condition is satisfied during automatic shutdown of said internal combustion engine.

7. An automatic shutdown control method for a vehicular internal combustion engine, comprising:
   permitting automatic shutdown of an internal combustion engine when a value indicative of vehicle driving history is equal to or greater than a predetermined reference value;
   automatically shutting down the internal combustion engine when a predetermined shutdown condition including said automatic shutdown permission is satisfied while said internal combustion engine is operating;
   detecting a degree of congestion of the road; and
   changing said reference value in accordance with the detected degree of congestion.

8. The automatic shutdown control method according to claim 7, wherein as the detected degree of congestion becomes higher, the reference value is changed to a smaller value.

9. The automatic shutdown control method according to claim 7, wherein the value indicative of said vehicle driving history is driving distance after start-up of said internal combustion engine.

10. The automatic shutdown control method according to claim 7, wherein the value indicative of said vehicle driving history is driving time after start-up of said internal combustion engine.

11. The automatic shutdown control method according to claim 7, wherein said degree of congestion is detected based on an average vehicle speed after start-up of said internal combustion engine.

12. The automatic shutdown control method according to claim 7, further comprising automatically starting up said internal combustion engine by driving an electric motor when a predetermined start-up condition is satisfied during automatic shutdown of said internal combustion engine.

13. A computer readable recording medium where a program for executing automatic start-up control on a vehicular internal combustion engine is recorded, wherein execution of said program by a computer causes the computer to perform steps comprising:
   permitting automatic shutdown of an internal combustion engine when a value indicative of vehicle driving history is equal to or greater than a predetermined reference value;
   automatically shutting down said internal combustion engine when a predetermined shutdown condition including said step of permitting automatic shutdown is satisfied while said internal combustion engine is operating;
   detecting a degree of congestion of the road; and
   changing said reference value in accordance with the detected degree of congestion.

14. The recording medium according to claim 13, further comprising the step of changing said reference value to be smaller as the detected degree of congestion becomes higher.

15. The recording medium according to claim 13, wherein the value indicative of said vehicle driving history is a driving distance after start-up of said internal combustion engine.

16. The recording medium according to claim 13, wherein the value indicative of said vehicle driving history is a driving time after start-up of said internal combustion engine.

17. The recording medium according to claim 13, wherein said step of detecting the degree of congestion of said road based on an average vehicle speed after start-up of said internal combustion engine.

18. The recording medium according to claim 13, further comprising the step of automatically starting up said internal combustion engine by driving an electric motor when a predetermined start-up condition is satisfied during automatic shutdown of said internal combustion engine.

* * * * *

UNITED STATES PATENT AND TRADEMARK OFFICE
CERTIFICATE OF CORRECTION

PATENT NO. : 7,099,768 B2  Page 1 of 1
APPLICATION NO. : 10/477938
DATED : August 29, 2006
INVENTOR(S) : Kouki Moriya It is certified that error appears in the above-identified patent and that said Letters Patent is hereby corrected as shown below:

On Title Page, should read,
--Item (54) AUTOMATIC SHUTDOWN CONTROL FOR VEHICULAR INTERNAL COMBUSTION ENGINE--

On Title Page, should read,
--Item (22) PCT Filed: Jun. 13, 2002--

Signed and Sealed this

Twelfth Day of December, 2006

JON W. DUDAS
*Director of the United States Patent and Trademark Office*